United States Patent [19]
Volat et al.

[11] 4,131,320
[45] Dec. 26, 1978

[54] CONVEYOR DEVICE FOR LETTERS, CARDS OR OTHER THIN ARTICLE

[75] Inventors: Jean-Pierre Volat, Aix-en-Provence; Jean-Louis E. Pichon, Marseilles, both of France

[73] Assignee: BERTIN & Cie, Plaisir, France

[21] Appl. No.: 585,883

[22] Filed: Jun. 11, 1975

[30] Foreign Application Priority Data

Jun. 11, 1974 [FR] France .................. 74 20107

[51] Int. Cl.$^2$ ............................................. B65G 51/02
[52] U.S. Cl. ............................. 302/2 R; 226/97; 271/195; 302/31
[58] Field of Search ......................... 302/2 R, 29, 31; 271/195; 226/97, 7; 34/156

[56] References Cited
U.S. PATENT DOCUMENTS

| 2,805,898 | 9/1957 | Willis | 302/29 |
| 3,385,490 | 5/1968 | Malmgren et al. | 302/29 |
| 3,395,943 | 8/1968 | Wilde et al. | 302/31 |
| 3,582,144 | 6/1971 | Woolard | 302/31 |
| 3,873,013 | 3/1975 | Stibbe | 226/97 |

Primary Examiner—Evon C. Blunk
Assistant Examiner—Jeffrey V. Nase
Attorney, Agent, or Firm—A. W. Breiner

[57] ABSTRACT

Thin articles such as letters are conveyed over a supporting fluid layer formed against a track surface along which they move. This layer is built up by jets issuing from nozzles located on both sides of the track surface and opening flush with the latter. The nozzles are oriented towards the center line of the track with somme inclination in the direction of motion of the articles, in order that the velocity of the jets presents a longitudinal component parallel to this direction and a transverse component pointing towards the center of the track.

2 Claims, 9 Drawing Figures

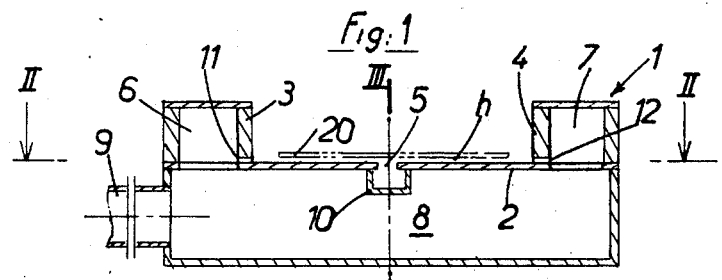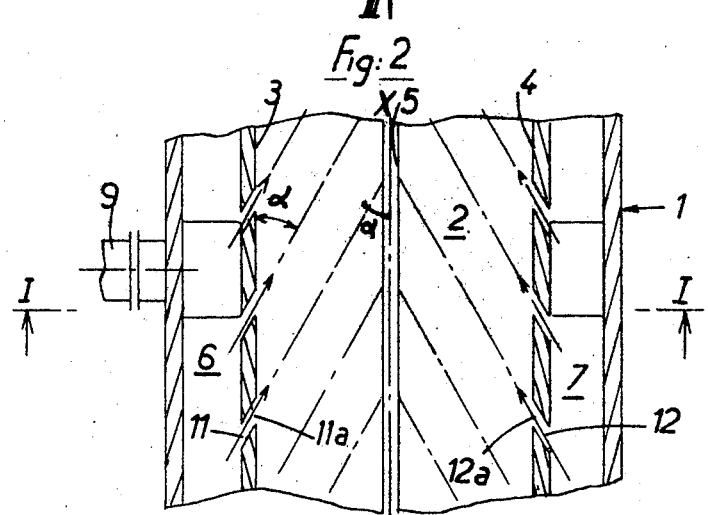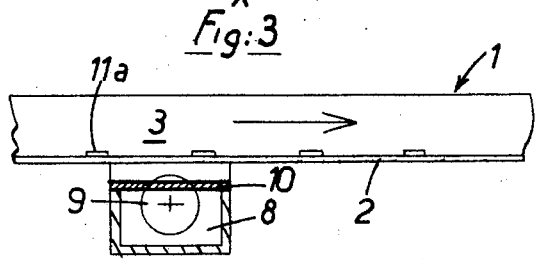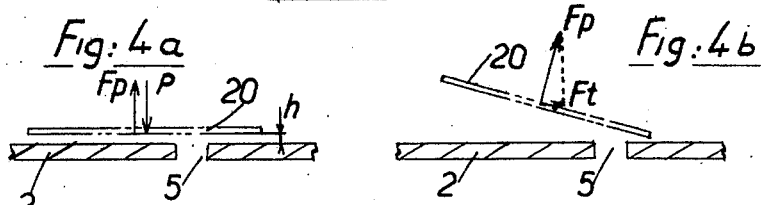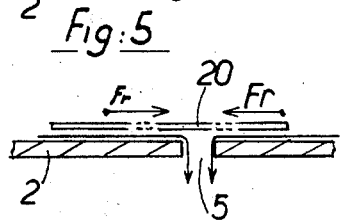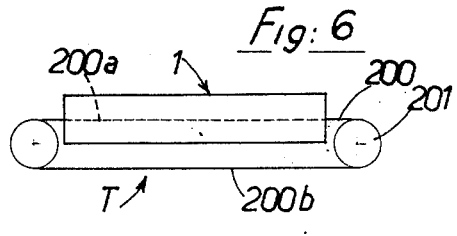

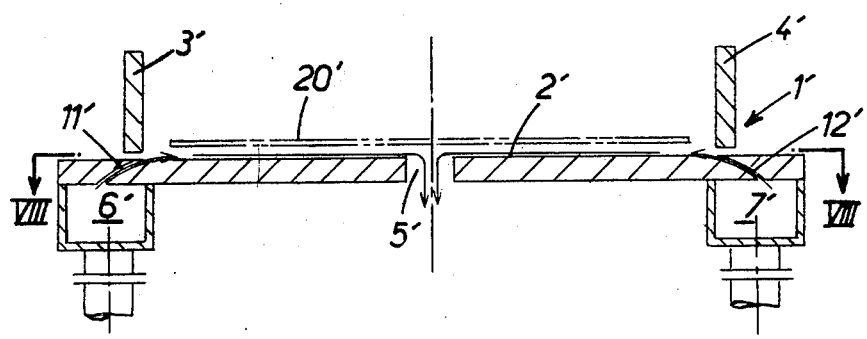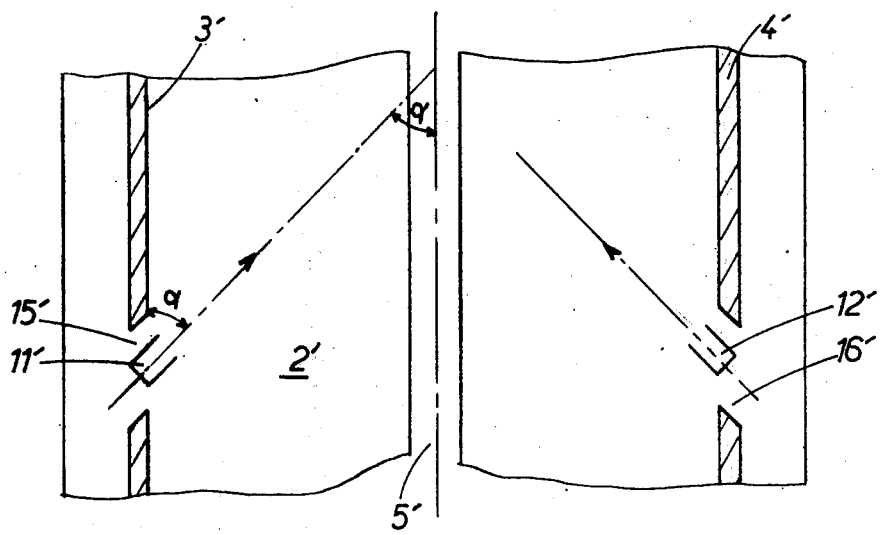

CONVEYOR DEVICE FOR LETTERS, CARDS OR OTHER THIN ARTICLE

The present invention relates to a device for the "fluidic" conveyance of thin articles, i.e., for the conveyance with interposition of a supporting fluid layer between the latter and the physical surface of a track.

It is known that the technology of the transport of articles by fluid offers, over conventional mechanical conveyors, advantages such as:

reduction of the risk of damaging the transported articles, operation which does not require the use of movable parts, possibility of using the fluid as a means of propulsion and control in addition to its support function, greatly reduced maintenance requirements and high reliability, possibility of working at high rates.

This technology is therefore conveniently applied to the transportation of thin articles in the form of continuous or discontinuous strips, and more particularly to the transportation of letters in installations for handling mail in view notably of the postal sorting.

However some acute technical problems arise when the articles to be conveyed at a relatively high speed and rate, have widely varying size and weight. Such is the case with letters since the envelopes are not all of same format and their weight varies in general from 2 to 50 grams, their speed may be of the order of a few meters per second and their rate of the order of some ten letters per second.

Under these circumstances, the hovering height of the articles over the track can greatly vary with their weight. Thus, if it is desired to support frictionlessly the heaviest letters, there is a risk of take-off of the lightest ones, this risk being moreover greater when the speed is higher. In order to combat this drawback, there is a tendency to use closed or semi-closed channels for conveying the letters, but then the risk of "clogging" (jamming of a letter which stops all the following ones) is greatly increased.

An object of the present invention is to overcome these defects by means of a conveyor device which comprises:

a track presenting a supporting surface along which the articles move, means for delivering jets of fluid under pressure from orifices located on both sides of, and substantially flush with, said supporting surface, said orifices being oriented towards the centre of the track but inclined in the direction of the axis of motion of the articles, so that the fluid velocity presents axially longitudinal and centripetally transverse components of substantial magnitude.

Preferably the inclination of said orifices is determined as a function of the ejection velocity of the fluid jets, so that the axially longitudinal velocity component of fluid under the articles to be transported is substantially equal to the rated progression speed of said articles.

The track conveniently presents two side extensions, giving it a trough-shaped cross-section, said orifices being formed in said extensions or close to them.

In a preferred embodiment of the present invention, the supporting surface — which is generally planar and horizontal — conveniently presents along the centre line of the track a fluid permeable zone, e.g. a slot, allowing discharge of fluid to the ambient medium.

In the accompanying drawings:

FIG. 1 is a diagrammatic vertical cross-section taken along line I—I of FIG. 2, showing an embodiment of the conveyor device according to the present invention.

FIG. 2 is a horizontal longitudinal section thereof taken along line II—II of FIG. 1.

FIG. 3 is a similar view but in vertical section taken along line III—III of FIG. 1.

FIGS. 4a, 4b and 5 are diagrams illustrating the mode of stabilization provided by the device.

FIG. 6 illustrates very diagrammatically an application of the invention to a belt conveyor.

FIGS. 7 and 8 are views similar to FIGS. 1 and 2 respectively, showing an alternative embodiment of the present invention, FIG. 8 being a section taken along line VIII—VIII of FIG. 7.

On FIGS. 1 to 3 is shown a track 1 of U-shaped cross-section, comprising a generally planar and horizontal supporting surface 2 and two generally vertical side walls 3 and 4. A slot 5 is formed in the supporting surface 2 along the centre line of the track and opens under it to the atmosphere; it is quite apparent that this slot 5 is continuous, though a multiplicity of holes distributed along said centre line may be substituted thereto.

Two manifolds 6 and 7 respectively associated to the walls 3 and 4 are fed with fluid under pressure (e.g. compressed air) from a caisson 8 extending under the track and being itself fed with pressurized fluid by a pipe 9 connected to a source (not shown). It is to be noted that a trough 10 extending under the track and opening to the atmosphere, insulates caisson 8 from slot 5. Manifolds 6 and 7 open on to track 1 through nozzles 11 and 12 respectively which are regularly distributed therealong and formed through the respective walls 3 and 4 to discharge substantially flush with the supporting surface 2. The outlets 11a, 12a of said nozzles have an elongated, substantially rectangular shape whose major side is parallel to the supporting surface 2. The axes of nozzles 11 and 12 are inclined in the direction of motion of the conveyed articles, making with the centre line XX of the track an acute angle α (see FIG. 2) determined as a function of the ejection velocity of fluid through outlets 11a, 12a in order that the velocity component of fluid parallel to XX be substantially equal to the rated speed of progression of the conveyed articles 20.

This arrangement allows complete liberation of the supporting surface 2 which is made, likewise to walls 3 and 4, of a very smooth material which has conveniently a low coefficient of friction. Optionally, surface 2 and/or walls 3 and 4 will bear an anti-friction coating. Under these circumstances, even though an article 20 such as a letter presents on its bearing face a sudden asperity (e.g. a folded or distorted corner), the contact of this asperity with the track will have no substantial braking effect.

Moreover the track surface 2 having wide strips which are compact, smooth and continuous i.e., without ports or roughnesses due to protrusions or recesses, there is no risk of hooking such asperity and arresting the article. This is also true in the case of slot 5 which has no transverse physical member level with the track surface, which could hook the asperity of an article.

In operation, the jets of pressure fluid issuing from outlets 11a and 12a as thin sheets flush with the supporting surface 2, stick thereto due to the wall adherence effect (sometimes called "Young's effect"). Therefore as soon as an article 20, say a letter, enters track 1, fluid inserts under the letter and a thin fluid bearing layer is established which maintains the letter at some hovering height h. The risk of fluid flowing above letter 20 and tackling it against the supporting surface 2, is practically eliminated thanks to said wall adherence effect. Thus an important flow of fluid adhering to the track surface 2 flows under letter 20 and discharges through slot 5. This results in a very strong "stiffness" of the suspension of the letter. In other words, the static pressure which lifts the letter varies very strongly as a function of hovering height h. The system is therefore self-adjusting in hovering height which is furthermore quite insensitive to variations in weight of the articles. So, in the case of two letters of different weight and/or width, the hovering height h will be very slightly different. Moreover, for a letter of given weight and/or width, even a slight increase or decrease in hovering height would respectively entail a large decrease or a large increase in static pressure under the letter, tending to bring it back to its initial height h. It is therefore apparent that letter 20 is positively kept by the fluid apart from, though very close to, the supporting surface 2, notwithstanding possible stray aerodynamic forces tending to upset the balance of the letter.

Now, at the same time, the system tends to eliminate such stray forces. As pointed out above, fluid flows under letter 20 with a velocity whose axially longitudinal component is substantially equal to the rated speed of progression of the letters. From this standpoint, the letter is therefore substantially stationary relative to the fluid and no aerodynamic phenomenon can develop; in particular the risk of take-off of light letters is practically nil. Another consequence of this arrangement lies in the fact that a letter 20 fed upon track 1 at the rated speed will keep this speed, any retardation or any acceleration of the letter being immediately counteracted by the fluid due to drag. The risks of overlap or telescoping of the successive letters 20 are therefore minimized.

The fluid which is introduced laterally, on both sides of letter 20, flows towards slot 5 through which it discharges (see FIG. 5). Antagonistic forces Fr exerted on the letter and produced by the drag effect due to the centripetal fluid velocity component, laterally guide the letter, any eccentricity thereof tending to be automatically compensated. This re-centring effect is also a result of the static pressure distribution under the letter. Slot 5 corresponds indeed to a zero pressure zone. In case of eccentricity of letter 20, the centre of pressure of forces Fp exerted under the letter is displaced, whereas the centre of gravity of weight forces P remains unaltered (FIG. 4a). A moment therefore develops which slants the letter (FIG. 4b): the static pressure forces thus present a component Ft which points towards the track centre line and which causes re-centring of the letter.

It will also be observed that, on the track 1 in accordance with the invention, the hovering height h of letters 20 is independent of their length. The invention is therefore also quite suitable to the support of continuous strips of very great length or even endless strips belonging to a conveyor T whose belt 200 passes over rollers 201 as illustrated in FIG. 6 wherein track 1 supports the upper side 200a of endless belt 200, the lower side 200b returning beneath track 1.

Preferably, the supply pressure of caisson 8 will be selected in the low-pressure range if progression speeds of the order of a few meters per second are to be achieved. Much higher speeds are however obtainable provided the fluid is supplied at high pressure, at the expense of an increase in consumed energy.

Satisfactory tests were carried out under the following conditions:
supply pressure: 5 to 10 mbs.
inclination of nozzles 11 and 12: $\alpha = 30°$
rectangular outlets 11a and 12a: 5 mms. long and 1 mm. wide.
Breadth of supporting surface 2: 130 mms.
width of slot 5: 2 mm.
conveyance speed of letters 20: 4 ms./sec.

FIGS. 7 and 8 illustrate an alternative embodiment of track 1', the parts similar to those of the preceding embodiment being referenced by the same numeral followed by a dash.

The nozzles 11' and 12' are here formed in the horizontal board of the track and supplied from manifolds 6', 7' extending under it; the outlines of nozzles 11', 12' merge tangentially with the supporting surface 2'. The side walls 3' and 4' present cut-out parts 15', 16', in register with nozzles 11' and 12', in order to allow ambient air to be induced by injector effect and diluted with the pressure fluid of the jets issuing from nozzles 11' and 12'.

This alternative embodiment is well suited to a high-pressure fluid supply allowing very high conveyance speeds.

We claim:

1. A generally trough-shaped topless track for conveying letters or like separate warpable thin articles of varying size and weight upon a supporting fluid layer, comprising:
   two longitudinal strips extending in an even plane alongside each other and physically bottoming said track, said strips having respectively adjacent though transversely spaced inner sides which bound a longitudinally-extending continuous slot-like passage formed through the track bottom, and remote outer sides which define the width of said track, each strip presenting between the inner and outer sides thereof a compact, smooth, and continuous surface designed for upholding adherence of fluid flow against said strip;
   upright sidewalls projecting from said strips along said outer sides thereof to bound said track; and
   a multiplicity of nozzles comprising elongated slots having a lower side immediately at said surface and an upper side slightly above said surface located adjacent the foot of said sidewalls and distributed along said outer sides of said strips at a level therewith to open flush with the respective compact, smooth, and continuous surfaces thereof, said nozzles being oriented towards said slot-like passage with some inclination towards the direction of motion of the articles, and being designed, when fed with pressure fluid, to issue over each strip a sheet of motive fluid coating said strip with a fluid layer adhering to said compact, smooth, and continuous surface thereof, said fluid exhausting through said continuous slot-like passage.

2. A generally trough-shaped topless track for conveying letters or like separate warpable thin articles of varying size and weight upon a supporting fluid layer, comprising:
   two longitudinal strips extending in an even plane alongside each other and physically bottoming said track, said strips having respectively adjacent though transversely spaced inner sides which bound a longitudinally-extending continuous slot-like passage formed through the track bottom, and remote outer sides which define the width of said track, each strip presenting between the inner and outer sides thereof a compact, smooth, and continuous surface designed for upholding adherence of fluid flow against said strip;

upright sidewalls projecting from said strips along said outer sides thereof to bound said track; and a multiplicity of nozzles located adjacent the foot of said sidewalls and distributed along said outer sides of said strips at a level therewith to open flush with the respective compact, smooth, and continuous surfaces thereof, said nozzles being oriented towards said slot-like passage with some inclination towards the direction of motion of the articles, and being designed, when fed with pressure fluid, to issue over each strip a sheet of motive fluid coating said strip with a fluid layer adhering to said compact, smooth, and continuous surface thereof, said fluid exhausting through said continuous slot-like passage and ambient air inlets operatively associated with said nozzles to form therewith injectors inducing ambient air upon issue of pressure fluid from said nozzles.

* * * * *